(12) United States Patent
Babej (10) Patent No.: US 8,608,419 B2
(45) Date of Patent: Dec. 17, 2013

(54) FUNCTIONAL ELEMENT, METHOD FOR AN INTRODUCTION OF THE FUNCTIONAL ELEMENT INTO A SHEET METAL PART AND ALSO COMPONENT ASSEMBLY

(75) Inventor: Jiri Babej, Lich (DE)

(73) Assignee: Profil-Verbindungstechnik GmbH & Co. KG, Friedrichsdorf (DE)

( * ) Notice: Subject to any disclaimer, the term of this patent is extended or adjusted under 35 U.S.C. 154(b) by 43 days.

(21) Appl. No.: 12/854,886

(22) Filed: Aug. 11, 2010

(65) Prior Publication Data

US 2011/0038687 A1    Feb. 17, 2011

(30) Foreign Application Priority Data

Aug. 13, 2009 (DE) .......... 10 2009 037 427

(51) Int. Cl.
*F16B 37/04* (2006.01)

(52) U.S. Cl.
USPC .......................... 411/183; 411/107

(58) Field of Classification Search
USPC .......... 411/501, 181, 183, 107, 112
See application file for complete search history.

(56) References Cited

U.S. PATENT DOCUMENTS

| 67,624 | A | * | 8/1867 | Wooten | 411/501 |
|---|---|---|---|---|---|
| 249,886 | A | * | 11/1881 | Bray | 411/501 |
| 3,772,957 | A | * | 11/1973 | Newton | 411/15 |
| 4,557,649 | A | * | 12/1985 | Jeal | 411/40 |
| 4,587,649 | A | * | 5/1986 | Maddern | 370/387 |
| 7,131,807 | B1 | * | 11/2006 | Babej | 411/181 |
| 7,731,467 | B2 | * | 6/2010 | Babej | 411/501 |
| 2001/0048859 | A1 | * | 12/2001 | Shinjo | 411/107 |
| 2003/0059272 | A1 | * | 3/2003 | Petrok et al. | 411/107 |
| 2004/0086328 | A1 | | 5/2004 | Babej | |
| 2005/0008453 | A1 | | 1/2005 | Babej | |
| 2005/0286970 | A1 | | 12/2005 | Babej | |
| 2006/0115344 | A1 | * | 6/2006 | Ladouceur | 411/181 |
| 2006/0204325 | A1 | | 9/2006 | Babej | |
| 2010/0135718 | A1 | | 6/2010 | Babej | |

FOREIGN PATENT DOCUMENTS

| DE | 34 47 006 C2 | 7/1985 |
|---|---|---|
| DE | 100 33 149 A1 | 2/2001 |
| DE | 100 02 223 C1 | 6/2001 |
| DE | 101 64 538 A1 | 7/2002 |
| DE | 101 14 200 A1 | 9/2002 |

(Continued)

OTHER PUBLICATIONS

German Search Report in corresponding German Patent Application No. 10 2009 037 427.2 dated Jul. 22, 2010.

(Continued)

*Primary Examiner* — Gary Estremsky
(74) *Attorney, Agent, or Firm* — Hershkovitz & Associates, PLLC; Abraham Hershkovitz; Eugene C. Rzucidlo (57) ABSTRACT

A functional element, in particular a bolt element consists of a shaft part and a head part designed for a rivet connection with a panel element, in particular a sheet metal part, with the head part being made hollow and having an outer diameter larger than that of the shaft part, is characterized in that the shaft part merges into the head part by a ring shoulder formed by a convexly rounded and in particular spherical surface such that the convexly rounded surface extends from the shaft part to the at least substantially cylindrical jacket surface of the head part.

6 Claims, 7 Drawing Sheets

(56) References Cited

FOREIGN PATENT DOCUMENTS

| EP | 0 755 749 B1 | 1/1997 |
| EP | 1 202 834 B1 | 5/2002 |
| EP | 1 346 160 A1 | 9/2003 |
| EP | 1 430 229 B1 | 6/2004 |
| EP | 1 609 561 A2 | 12/2005 |
| WO | WO 01/03880 A1 | 1/2001 |
| WO | WO 02/053924 A1 | 7/2002 |
| WO | WO 03/029667 A1 | 4/2003 |

OTHER PUBLICATIONS

English language translation of German Search Report in corresponding German Patent Application No. 10 2009 037 427.2 dated Jul. 22, 2010.
European Search Report in corresponding European Patent Application No. 10007869.0-1262 dated Nov. 16, 2010.
English language translation of European Search Report in corresponding European Patent Application No. 10007869.0-1262 dated Nov. 16, 2010.

* cited by examiner

FUNCTIONAL ELEMENT, METHOD FOR AN INTRODUCTION OF THE FUNCTIONAL ELEMENT INTO A SHEET METAL PART AND ALSO COMPONENT ASSEMBLY

CROSS-REFERENCE TO RELATED APPLICATIONS

This application claims priority of German Patent Application No. 10 2009 037 427.2, filed Aug. 13, 2009, the disclosure of which is expressly incorporated by reference herein in its entirety.

FIELD OF THE INVENTION

The present invention relates to a functional element, in particular to a bolt element, consisting of a shaft part, and a head part designed for a rivet connection to a panel element, in particular to a sheet metal part, with the head part being made hollow and having an outer diameter larger than that of the shaft part and also to a method for the introduction of the functional element into a sheet metal part and to the component assembly resulting therefrom.

BACKGROUND OF THE INVENTION

A functional element of this kind is shown in FIG. 6 of the PCT application with the publication number WO 01/03880 and indeed as a variant of a bolt element, the head part and shaft part of which have at least substantially the same diameter. The corresponding PCT application led amongst other things to the European patent 1 202 834. A bolt element of this kind is sold by the company Profil Verbindungstechnik GmbH & Co. KG in the form of a so-called spherical bolt which is claimed per se in the European patent 1 346 160. The bolt element is riveted to a sheet metal part such as the tail gate of a vehicle in the area of the head part, with the end of the shaft part remote from the head part being provided with a spherical shape. The spherical end of the shaft part then forms a part of a ball joint, the socket of which is part of a gas spring which serves to support the tail gate.

A similar functional element is for example known from the German patent specification 34 47 006 and is realized there is a threaded bolt, with the head part being provided with a tubular piercing and riveting section which is adapted to pierce a sheet metal part and for the subsequent formation of a rivet bead, whereby the element is secured in the sheet metal part. Between the tubular piercing and riveting section the head part has a flange with a ring surface standing perpendicular to the longitudinal axis of the element and the ring surface is normally arranged after the introduction of the element into a sheet metal part just below the side of the sheet metal part adjacent the shaft part.

The piercing slug formed on piercing the sheet metal part is pressed into the piercing and riveting section and thereby assists the rivet connection with the sheet metal part. DE-PS 34 47 006 however also describes functional elements in the form of nut elements, where the shaft part can be understood to be an extension of the head part and this is provided with an internal thread. The shaft part does not however have to be designed as a thread, many designs can be considered, for example a guide spigot or pin-like design on which for example carpets can be secured by means of corresponding clips.

Such functional elements, i.e. in accordance with DE-PS 34 47 006 C2 have proven themselves over many years and make it possible to produce a high-quality connection between the element and the sheet metal part. However such elements are relative expensive to manufacture and require in part the use of extremely precisely operating cold heading machines which operate relatively slowly to achieve the desired quality. The need to use relatively expensive cold heading machines and the restricted working speed leads to relatively high production costs. Moreover, for some applications, it will be more favorable if the weight of the elements could be reduced.

In a functional element in accordance with FIG. 6 of WO 01/03880 it is problematic that the element requires a considerable deformation of the head part on the attachment to a sheet metal part and becomes deformed in undesired manner, whereby the quality of the connection suffers. A disadvantage of this kind is not acceptable in mass production where thousands of functional elements are used and indeed not even if the undesired deformation only occurs occasionally, because such events disturb the production sequence quite apart from the undesired scrap.

SUMMARY OF THE INVENTION

The present invention is based on the object of presenting a functional element of the initially named kind which enables a high quality connection to the sheet metal part and which ensures that no undesired deformation arises on the attachment of the sheet metal part but rather only the respectively desired deformation of the head part. Furthermore an improved security against rotation should be provided even without features providing security against rotation as well as good resistance to pull-out and button-out, whereby the functional elements should likewise be able to be made efficiently and at a favorable price.

In order to satisfy this object provision is made in a functional element of the initially named kind that the shaft parts merges via a ring shoulder formed by a convexly rounded surface into the head part in such a way that the convexly rounded surface extends at least substantially from the shaft part up to the at least substantially cylindrical jacket surface of the head part.

By the statement that the convexly rounded surface extends "at least substantially" from the shaft part up to the at least substantially cylindrical jacket surface of the head part is intended to express the fact that for example a radius or a chamfer can be provided as a transition between the shaft part and the rounded surface and/or for example a conical transition between the rounded surface and the cylindrical jacket surface, with such transitions having only smaller axial heights and angular extents in comparison to the rounded surface.

The functional element in accordance with the invention is thus manufactured without a flange part which extends radially beyond the head part or the rivet section. This contributes to the efficient cost-favorable manufacture of the functional element.

In known functional elements with a flange part the function of the flange part is, on the one hand, to provide an adequate surface area which prevents the element becoming loose in the sheet metal part and, on the other hand, however also to form a surface onto which further sheet metal parts and other components can be secured, for example, if a bolt element is involved, by a nut which is screwed onto the shaft part of the functional element which has a thread.

With the functional elements in accordance with the invention, this flange is not present at the functional elements itself. In the introduction of the functional elements into the sheet metal part the end face of the functional element is punched as with the known elements through the sheet metal part and is reshaped to form a rivet bead at the side of the sheet metal part remote from the shaft part of the element. Furthermore, the functional element is so compressed in the longitudinal direction that a part of the hollow head part is formed into a ring fold or ring bead which now serves as a flange and which takes over the functions explained above of the customary flange.

In accordance with the invention, as also in the prior art in accordance with FIG. 6 of WO 01/03880, at least the head part of the element is made hollow and, during the attachment to the sheet metal part, is likewise formed into the rivet bead on one side of the sheet metal part and into a ring fold at the other side of the sheet metal part, with the rim of the hole of the sheet metal part being clamped between the rivet bead and the ring fold.

Since, in the elements in accordance with the invention, the outer diameter of the head part is larger than that of the shaft part the ring fold that arises and the rivet bead that arises likewise have a larger diameter than with comparable elements in which the head part and the shaft part have the same diameter. Through the rounded shape of the transition from the shaft part into the head part the length of the cylindrical region of the head part is reduced in comparison to the embodiment of FIG. 6 in accordance with WO 01/03880, whereby its controlled deformability is improved. The axial height of the rounded transition thus contributes to the total length of the head part.

Through the enlarged diameter of the ring fold and of the rivet bead a higher resistance to rotation is achieved simply by hole friction. Furthermore the larger diameter means a significantly higher resistance to draw-out and button-out can be achieved. Through the special shaping of the transition between the shaft part and the head part, i.e. through the convexly rounded surface, which extends from the shaft part up to the at least substantially cylindrical jacket surface of the head part, one succeeds in a surprising manner in largely avoiding undesired deformations of the functional element and of the sheet metal part during the attachment of the functional element to the sheet metal part.

The convexly rounded surface is preferably at least substantially a spherical rounded surface. Moreover, the internal space of the hollow head part is made at least substantially circularly cylindrical and has in the transition region between the head part and the shaft part at least substantially a hemispherical shape, the radius of which has its origin on the central longitudinal axis of the functional element and which is at least substantially of the same size as the radius of the cylindrical inner space of the head part.

Furthermore, the wall thickness of the rounded or spherically shaped transition from the head part into the shaft part is at least substantially constant. This wall thickness of the rounded or spherically rounded transition from the head part into the shaft part corresponds at least substantially to the wall thickness of the hollow head part in its cylindrical region, without account having to be taken of the radial height of any features provided for security against rotation, such as ribs providing security against rotation or recesses providing security against rotation.

This preferred embodiment of the transition from the shaft part into the head part likewise contributes to solving the object underlying the invention, i.e. they all help to preclude undesired deformation of the head part during the attachment of the functional element to a sheet metal part.

The shaft part at the end remote from the head part can have a spherical shape, the radius of which is larger than that of t to the sheet metal part he shaft part. In this way a spherical bolt is realized which has a particularly good button-out resistance through the enlarged diameter of the ring fold and of the rivet bead, a property which is particularly important in a spherical bolt. Even if a spherical bolt is normally not exposed to pronounced rotational forces, because these can in principle only arise through friction, one in any event succeeds with the enlarged diameter of the ring fold and of the rivet bead in achieving an adequate resistance to rotation.

The functional element does not have to be realized as a spherical bolt. Instead of this the shaft part can be provided with an external thread or with latching features for receiving a clip which is plugged onto it. A hollow design of the shaft part with an internal thread can also be considered.

In such embodiments, in particular those with an external thread or an internal thread, the jacket surface of the head part can be provided with features providing security against rotation, such as for example longitudinal ribs and/or longitudinal grooves which lead to an increased resistance to rotation.

The design of the functional elements makes it possible, on the one hand, to design the functional element to be self-piercing, i.e. such that the element itself pierces a hole in the sheet metal part during the attachment of the sheet metal part and ensures, on the other hand, the desired design of the rivet bead and of the ring fold in accordance with the invention.

The functional element in accordance with the invention can be made as a cold headed part from wire or from bar material. It can however also be manufactured from tube material if a hollow shaft part is desired. In this connection any thread which is present on the shaft part can be made by a thread rolling process or by a pressure reshaping process. Latching features can also be generated at the shaft part in a rolling method or in a deformation method.

Furthermore, the functional element cannot only be made at favorable cost by cold heading but rather also by high pressure shaping methods when a tube is used as a starting material. Moreover, other favorably priced manufacturing methods can be considered. Although only a hollow head part is required for the attachment of the part to a work piece, the functional element can be manufactured throughout as a tubular part. The manufacture with a larger internal diameter in the hollow head part than in the shaft part can also be realized at favorable cost, above all a tube is used as a starting material.

As indicated above, the actual flange is only subsequently formed with the present invention. Since the sheet metal part is clamped in form-fitted manner within a relatively large area mount between the rivet bead on the one hand and the ring fold on the other hand the functional element in accordance with the invention has a good resistance to rotation. The variant in which the piercing slug is clamped within the rivet bead increases the security of rotation further and moreover also increases the pull-out resistance.

Should it be necessary to increase the security against rotation still further this can take place in different ways. On the one hand smaller features providing security against rotation such as grooves or noses can be provided in the region of the head part forming the rivet bead. On the other hand, radially extending noses can be provided either in the die button for the formation of the rivet bead and/or in the end face of the plunger which forms the ring fold which then lead to a mutual deformation of the sheet metal part and of the contacting regions of the rivet bead and/or of the ring fold and serve to increase the security against rotation.

Furthermore, in accordance with EP 1 609 561, features providing security against rotation can be impressed into the sheet metal part in the sense of a sheet metal preparation prior to the attachment of the functional element in the sheet metal part. On attachment of the functional element the features providing security against rotation lead to a corresponding local impression of the ring fold and/or of the rivet bead, whereby the security against rotation is increased.

It is also possible to equip the surface of the ring fold with sharp radially extending noses or the like which serve for an electrical contact to a terminal. Such noses can either be provided at the outer surface of the head part prior to the introduction of the element or can first subsequently be formed or impressed into the exposed surface of the ring fold during the formation of the ring fold by means of a corresponding shape of the end face of the plunger.

Particular advantages and preferred embodiments of the functional element and also of the method for the introduction of the element into a sheet metal part, of the so manufactured component assembly, of the die button used to manufacture the component assembly and of the plunger arrangement used can be found in the patent claims and in the following description.

BRIEF DESCRIPTION OF THE DRAWINGS

The invention will now be explained in more detail in the following with reference to embodiments and to the accompanying drawings in which are shown:

FIG. 1A a section of a functional element in the form of a bolt element, partly sectioned in the longitudinal direction, FIG. 1B a plan view onto the end face of the head part of the bolt element of FIG. 1A, FIGS. 2A, 2B drawings corresponding to FIGS. 1A and 1B respectively, of an element in accordance with the invention in the form of a spherical bolt, FIG. 3A the first step of the introduction of the functional element in accordance with the invention into a thin sheet metal part, FIGS. 3B, 3C, 3D intermediate stages in the introduction of a functional element into the sheet metal part, FIG. 3E the end of the introduction method prior to opening of the press or tongs used for this purpose, FIG. 4 a representation corresponding to FIG. 3E but with the attachment of a functional element to a thicker sheet metal part, FIGS. 5A to 5D illustrations to explain a possible sheet metal preparation prior to the attachment of the functional element, FIGS. 6A, 6B and also 7A, 7B a representation of the attachment of the functional element in accordance with the invention with a head part having a larger diameter than that of the shaft part to a sheet metal part prepared in accordance with FIGS. 5A to 5D, FIG. 8 a sectioned drawing of a setting head which can be used for the attachment of a functional element in accordance with the invention in a sheet metal part.

DETAILED DESCRIPTION OF THE INVENTION

Figure 1A:
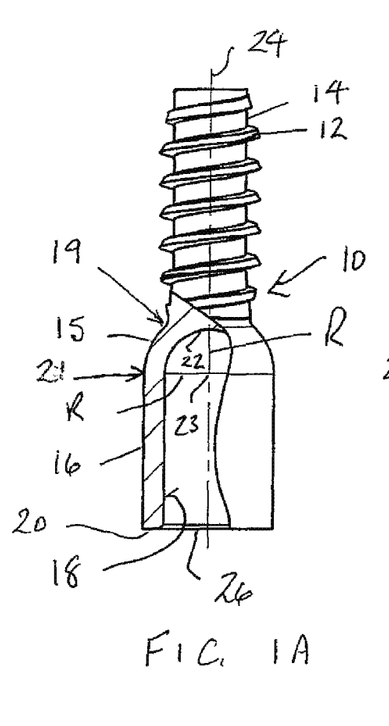
Figure 1B:
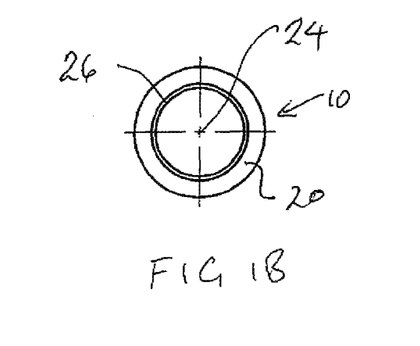

The functional element 10 of FIGS. 1A and 1B comprises a shaft part 14 provided with an external thread 12 and a hollow head part 16 having a larger outer diameter in comparison to the shaft part, i.e. an outer diameter which is larger than the outer diameter of the thread cylinder of the shaft part 14. The thread shown here has a special thread form which can be used for less critical threaded connections, for example for the manual or automatic screwing on of a clip, for example of plastic. A full quality thread, for example in accordance with DIN, is also possible.

Within the hollow head part 16 there is a circular cylindrical hollow cavity 18 which leads from the end face 20 of the head part 16 remote from the shaft part 14 to directly below the thread cylinder and there terminates in a continuous transverse wall 22. The hollow cavity 18 has here the shape of a bore. The transverse wall 22 is formed here by a hemispherical surface, could however have another concave shape, for example a conical shape. The hollow cavity and the transverse wall can for example be manufactured by means of a cold heading process. The longitudinal axis of a functional element 10, which is realized here as a bolt element, is designated with 24.

The element 10 has, at the end face 20, an inner cutting surface 26 which merges here into a ring surface which forms the end face of the head part and lies here in a plane perpendicular to the longitudinal axis 24. Instead of this, the end face could be provided with an outer rounded piercing and drawing edge in precisely the same way as a corresponding end face of the piercing and riveting section of the functional element in accordance with DE-PS 34 47 006 C2, preferably however in accordance with EP-B-1 430 229.

In FIG. 1A the cutting surface 26 is made relatively small, which is not essential but is however preferred.

A special feature of the functional element in accordance with FIGS. 1A and 1B lies in the fact that the shaft part 14 merges via a ring shoulder into the head part 16, with the ring shoulder being formed by a convexly rounded surface 15 and indeed in such a way that the convexly rounded surface 15 extends from the shaft part 14 up to the at least substantially cylindrical jacket surface of the head part 16, i.e. between the positions 19 and 21. In this connection the convexly rounded surface 15 is at least substantially a spherically rounded surface. This is however not necessarily required but rather a rounded surface which is approximately spherical, for example a rounded surface which represents a body of rotation of a rounded shape and corresponds to the curved side of a section of an ellipse or an oval, would also be possible. A sector could also be considered here by way of example which, starting from a smaller diameter of an ellipse, extends over approximately 60°, for example from 270° to 330° or has an angular extent of approximately −30° up to approximately +30° related to the larger diameter of an ellipse, preferably, an ellipse, in which the ratio of the two diameters to one another amounts to $D1/D2 \leq 2$.

As expressed above, the transition region of the inner space 18 of the hollow head part 16 between the head part 16 and the shaft part 14 preferably has an at least substantially hemispherical shape, the radius R of which lies at the origin 23 on the central longitudinal axis 24 of the functional element and is at least substantially of the same size as the radius R of the cylindrical inner space of the head part. This hemispherical shape can also be replaced by a semi-elliptical or half oval form in analogous manner to the convex surface 15, i.e. the statements made above concerning the possible shaping of the surface 15 also apply in principle to the shaping of the end of the inner space 18 adjacent the shaft part, but here the angular extent extends from 270° to 0° or from 225° to 315°. It is particularly favorable (even if not essential) for the wall thickness of the rounded or spherical rounded transition from the head part into the shaft part to be at least substantially constant.

Figure 2A:
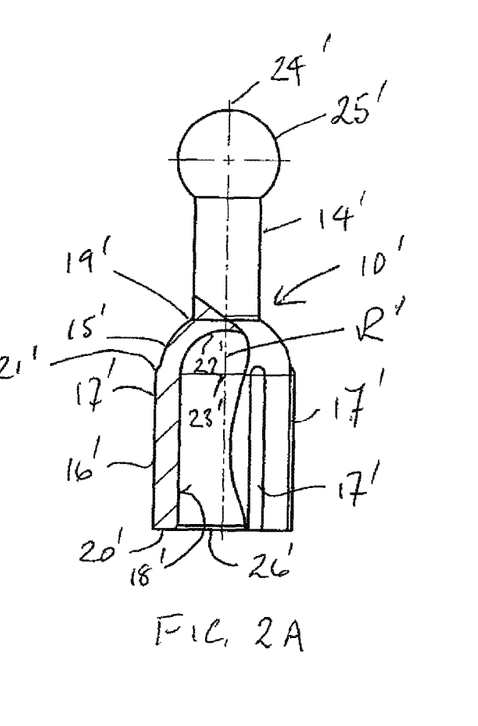
Figure 2B:
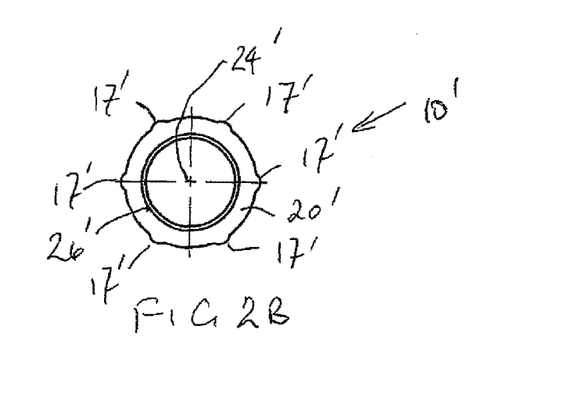

The FIGS. 2A and 2B show a functional element 10' which is similar to the functional element 10 of FIG. 1A. In FIGS. 2A and 2B the same reference numerals have been used as in the FIGS. 1A and 1B but with an additional prime (') and also have the same meaning, i.e. the description of the corresponding parts or features of shape which was set forth for the embodiment of FIGS. 1A and 1B also applies to FIGS. 2A and 2B.

In distinction to the functional element of FIG. 1A the head part 16' of the functional element 10' has ribs 17' extending in the longitudinal direction, here six in number, but this is not critical. Instead of six ribs 17' providing security against rotation one could for example provide a number between two and twenty-four or even more if, for example, these have the shape of a knurling. Also, grooves providing security against rotation could be provided in the surface of the head part 16' instead of the ribs 17' providing security against rotation or alternate ribs and grooves providing security against rotation can be used. Such features providing security against rotation could also be provided in the embodiment of FIGS. 1A and 1B.

Furthermore, the functional element 10' in accordance with FIGS. 2A and 2B is characterized in that it has a spherical shape at the end of the shaft part 14' remote from the head part 16' whereas the shaft part 14' is formed here as a cylindrical part, i.e. has no thread cylinder as in the embodiment of FIGS. 1A and 1B. Accordingly; this is a spherical bolt. Other variants are also possible. For example, the embodiments in accordance with FIGS. 1A and 1B and FIGS. 2A and 2B could be realized in such a way that the shaft part 14 and optionally the ball 25' are hollow. Such elements could then be manufactured from tube material.

FIGS. 3A to 3E now show various stages of the attachment of the functional element 10 in accordance with FIGS. 1A and 1B into a sheet metal part 30 with the aid of a die button 32 and of a setting head 40.

Figure 3A:
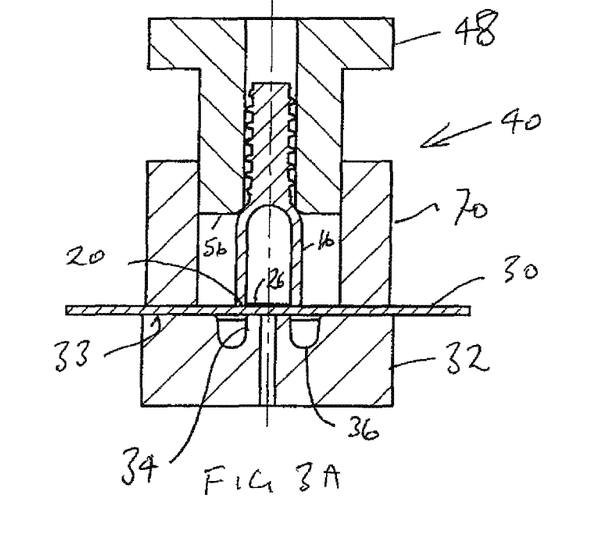

The die button 32 is located in a bore of a non-shown lower tool of a press, the upper side of which is normally arranged flush with the end face of the die button. In the lower tool a plurality of pins are arranged around the die button 32 which are biased upwardly by means of springs and which support the sheet metal part 30 during the introduction into the press, The pins can however be pressed downwardly on closing of the press as a result of a force exerted by a hold-down member, not shown, so that the sheet metal part 30 comes into contact with the end face 33 of the die button 32 and with the upper side of the lower tool in the region of the die button. It is then non-displaceably clamped there between the hold-down member and the die button 32 and/or the lower tool. For example three such spring-loaded pins can be provided in the lower tool which are for example arranged at uniform angular spacings around the central longitudinal axis of the die button 32. The central longitudinal axis of the die button is aligned with the central longitudinal axis 24 of the functional element 10. The reference numeral 70 points here to a sprung nose piece of the setting head which guides the plunger 48 and likewise has a hold-down function in the sense that the sheet metal part 30 is pressed by means of the sprung nose piece 70 against the end face 33 of the die button 32.

The die button 32 is equipped with a centrally arranged cylindrical plunger projection 34 which is designed in similar manner to the plunger projection of the corresponding die button of DE-PS 34 47 006 C2 but lies here in the plane of the end face 33 of the die button. This plunger projection 34 is surrounded by a ring recess 36 which is rounded in the base region and which merges into the ring surface 33 confronting the sheet metal part 30 which is provided in the end face 32 of the die button. On the whole the die button 32 is similar to the die button 180 described in DE-PS 34 47 006.

FIG. 3A shows the state after the sheet metal part 30 has been introduced into the press and the closing of the press has started and indeed to such a degree that the hold-down member 70 and the end face 20 of the functional element 20 contact the upper surface of the sheet metal part 30 and lightly clamp the sheet metal part between them and the die button 32.

Figure 3B:
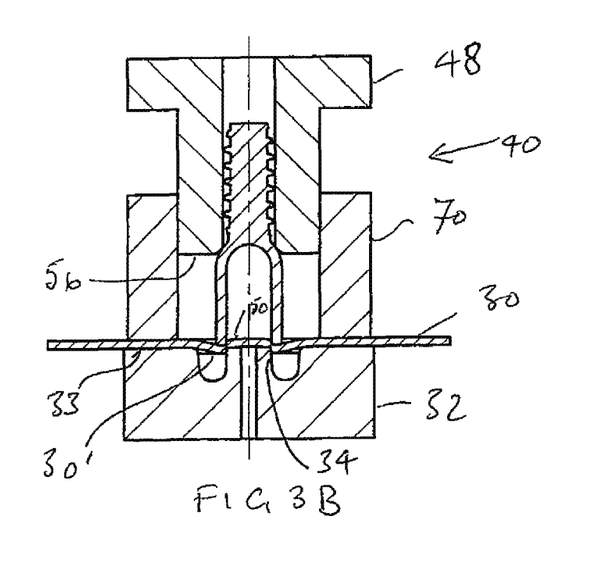

In the stage of the manufacturing step in accordance with FIG. 3B the end face 20 of the functional element has pressed the sheet metal part partly into the ring recess 36 of the die button, under the pressure of the plunger 48, which presses against the upper region of the convexly rounded surface and which is matched in the shape to the latter and has drawn a shallow approximately conical recess 30' in the sheet metal part 30. In the stage of FIG. 3B the plunger projection 34 has further cut a piercing slug 50 out of the sheet metal part in conjunction with the cutting surface 26 at the end face of the head part 16 of the functional element 10.

Figure 3C:
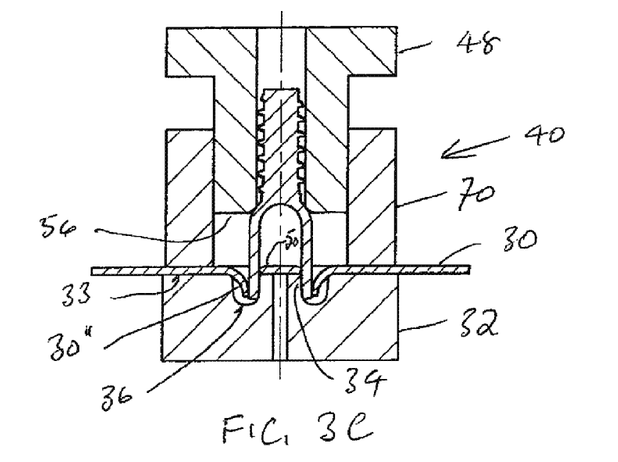
Figure 3D:
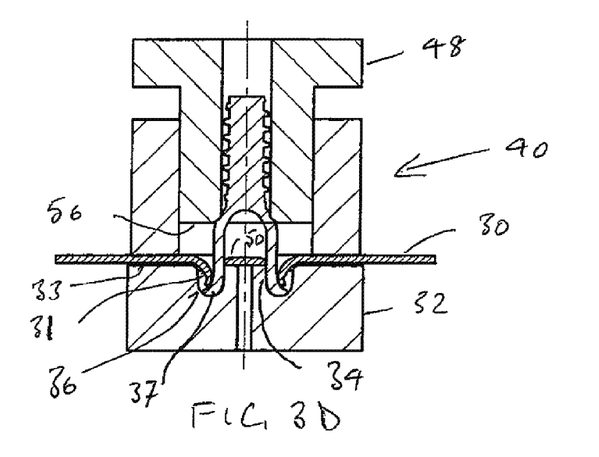

It is evident from FIG. 3C, which shows the state after a further closing movement of the press than that of FIG. 3B, that the conical recess 30" of the sheet metal part has now been drawn significantly lower relative to the conical recess 30' in accordance with FIG. 2B and that the end face of the functional element 10 has been pushed through the hole in the sheet metal part broadened by the head part of the functional element 10 and indeed in such a way that the conical cutting surface 26 has reached the rounded base surface of the ring recess 36, whereby, in the subsequent stage in accordance with FIG. 3D the cylindrical head part is "rolled" outwardly in ring-like manner at the end face 30, i.e. is beaded over.

It is also evident from FIG. 3D that the plunger 48 has also traveled further downwardly in comparison with FIG. 3C with the free end region of the hollow head part of the element 10 having been formed as a result of the rounded ring recess, i.e. of the rolling surface 36 in the die button, around the downwardly drawn rim of the hole of the sheet metal part to form an initial ring-like rivet bead 37. The hole in the sheet metal part has, in this stage of the method, a hole with a rim 31 which resembles the mouth of a trumpet.

Figure 3E:
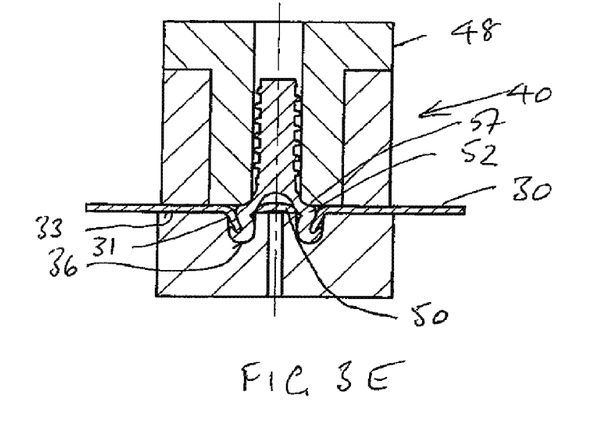

In the further course of the downwardly directed movement of the plunger 48 the wall of the head part 16 is compressed in accordance with FIG. 3E, in the region of the rounded surface and of the cylindrical wall neighboring this directly below the shaft part 14, so that a ring fold 52 is formed. The constraints to which the functional element 10 is subjected as a result of the guidance by the plunger 48 on the one hand and by the hole rim 31 and by the piercing slug 50 on the other hand, and also by the form of the ring recess 36, ensures that the deformation takes place as shown in FIGS. 3A to 3E. The rivet bead 37 now has its final form in accordance with FIG. 3E.

One notes here that with a relatively thin sheet metal part, i.e. with a sheet metal thickness in the range between approximately 0.6 mm to 1.8 mm the hole rim 31 has an approximately conical shape and is clamped between the rivet bead 37 and the ring fold 52, with the ring surface 57 lying above the ring fold in the plane of the upper side of the sheet metal part 30. If required the plunger can have a small axial ring projection, for example with an axial height of 0.02 mm in this region in order to ensure that the ring surface does not project above the upper side of the sheet metal part but is rather slightly set back relative to this.

If required the nose 56 of the plunger 48 can be equipped with shape-giving features in the region of the contact surface with the rounded surface which, on the one hand, lead to a desired hooked arrangement between the sheet metal part 30 and the hollow head part 16 which promotes the security against rotation. It can, on the other hand, also be executed such that for example noses arise in the upper ring surface of the ring fold 52 in FIG. 3E which serve for a high quality electrical contact, for example if the functional element is used as an earth connection element. Alternatively, or in addition to this type of realization of the security against rotation, the element can also be adhesively bonded to the sheet metal part with the aid of an adhesive. For example, the functional element 10 can be coated in the region of the head part 16 with a dry adhesive which is first activated under pressure during the attachment of the functional element to the sheet metal part.

In the stage of FIG. 3E the introduction of the functional element 10 into the sheet metal part 30 is completed. The press opens and the so produced component assembly then has the form which is evident from FIG. 3E.

In this description it is initially assumed that the die button 32 is a die button which is arranged in the lower tool of a press. In this case, the setting head 44 is either secured to the upper tool of the press or to an intermediate plate of the press. The die button 32 can however just as well be arranged at the intermediate plate and then cooperate with a setting head which is arranged at the upper or lower tool of the press. In just the same way it is possible to mount the die button 32 in the upper plate of the tool and to install the setting head at the intermediate plate or at the lower tool of the press. Moreover the setting head 40 and the die button 32 can also be pressed towards one another by a robot or can be brought together by other devices such as force-actuated tongs.

One notes from FIG. 3E that the piercing slug 50 closes the central passage of the hollow functional element 10 in the region of the rivet bead 37 so that at this point the rivet connection of the functional element 10 to the sheet metal part 30 is enhanced.

Figure 4:
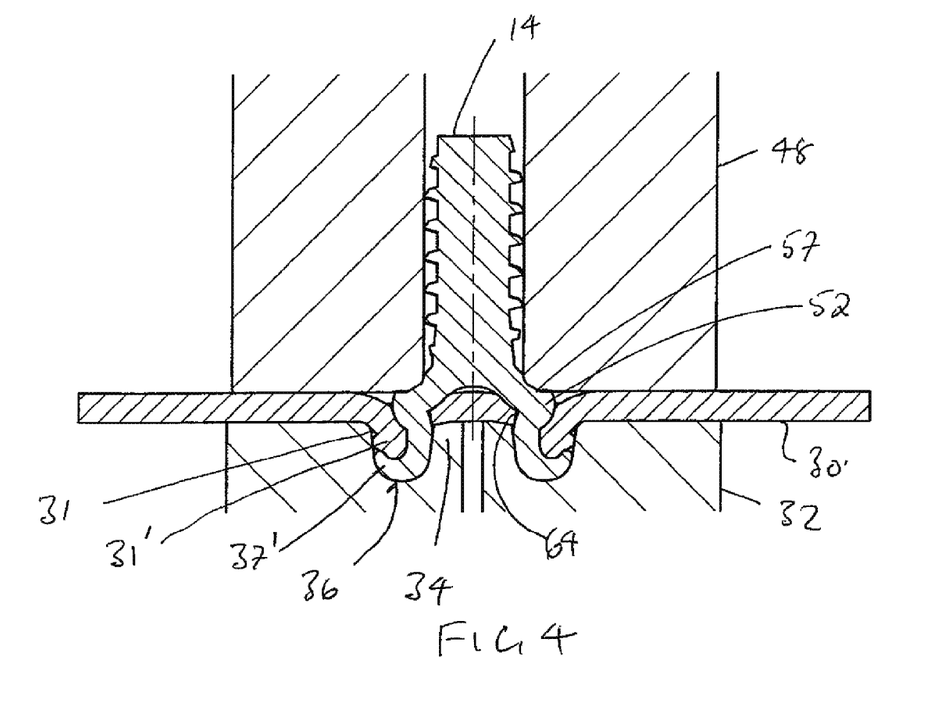

When using a thicker sheet metal part, for example above about 1.8 mm, the finished component assembly manufactured in the press is shown in accordance with FIG. 4 to be slightly different than in FIG. 3E.

In accordance with FIG. 4 the sheet metal part 30 is somewhat more deformed in the region of the generally conical hole rim 31, so that a thicker region 31' is surrounded in the generally U-shaped rivet bead 37'. The function and quality of the connection is however present in just the same way as in the embodiment of FIGS. 3A to 3E.

The FIGS. 5A to 5D show a possible sheet metal preparation which is in particular of importance when an element such as in FIGS. 1A and 1B or another element in accordance with FIG. 2A or 2B is used without features providing security against rotation (although the use of a functional element with features providing security against rotation is not excluded), since the sheet metal preparation in accordance with FIGS. 5A to 5D itself leads to an additional security against rotation.

Basically a sheet metal part 30 is provided in the course of a sheet metal preparation in accordance with FIGS. 5A to 5D, here in the form of a round disc but actually with any other desired shape, with a special impression in order to produce features providing security against rotation in the sheet metal part. I.e. the features providing security against rotation are introduced into the sheet metal part in accordance with the European patent application with the publication number EP-A-1 609 561.

Figure 5A:
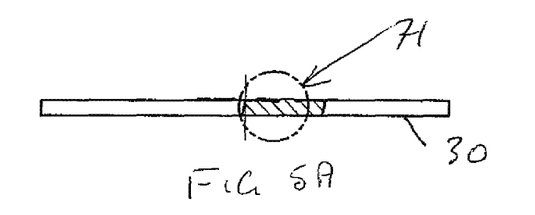
Figure 5B:
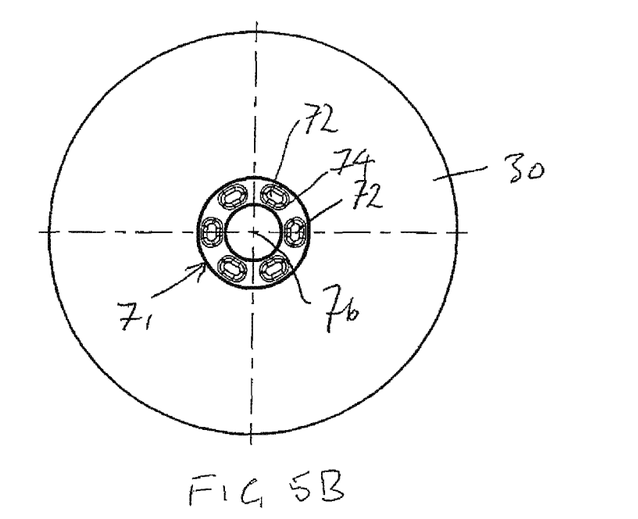
Figure 5C:
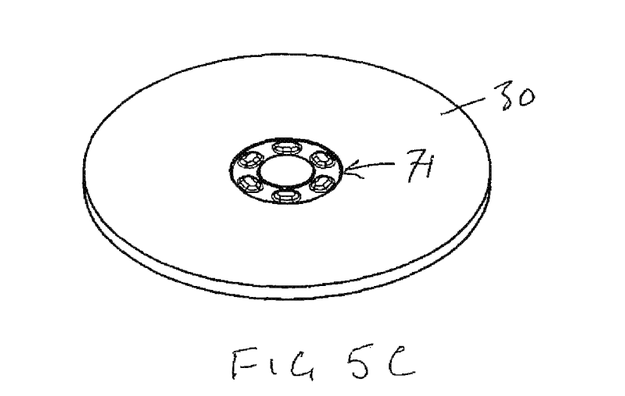
Figure 5D:
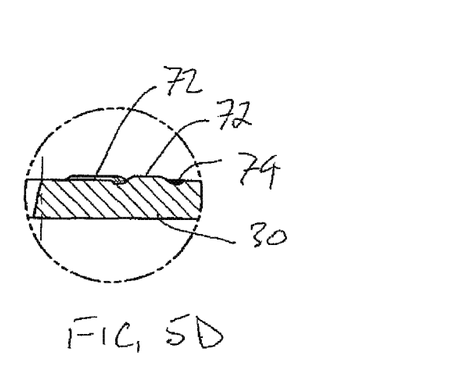

More specifically, the sheet metal part is provided with a ring-like coined feature 71 which can best be seen from the plan view of the FIG. 5B or from the enlarged section of the drawing of FIG. 5D (an enlarged representation corresponding to the circular enclosed region of FIG. 5A). This ring-like coining consists in this example of discrete, elongate raised portions 72, which are respectively surrounded by a peripherally extending groove 74. In this example six regularly disposed island-like raised portions 72 are arranged around the central longitudinal axis 72 of the sheet metal part. The material for the raised material portion 72 is obtained by displacing the material in the region of the corresponding grooves 74. The sheet metal part is here not pre-pierced, although the pre-piercing of the sheet metal part represents a possible alternative in all embodiments.

Figure 6A:
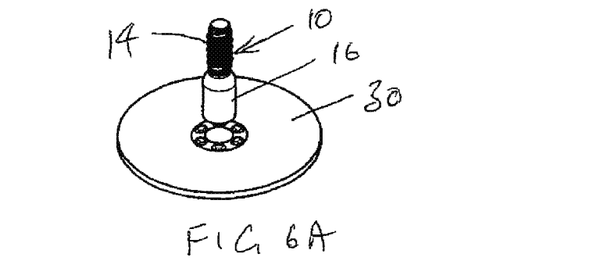
Figure 6B:
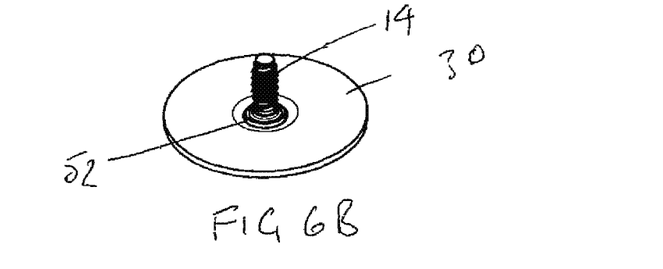
Figure 7A:
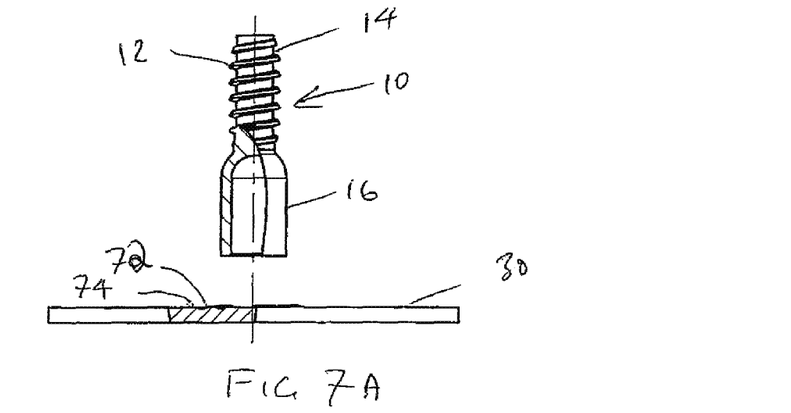
Figure 7B:
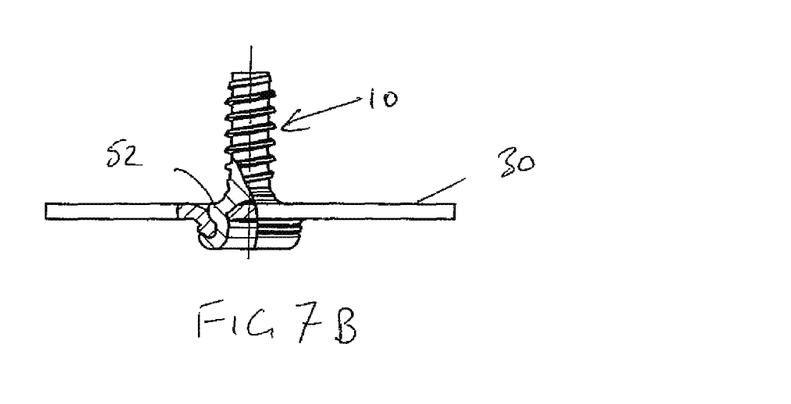

FIGS. 6A and 6B then show how the element in accordance with FIGS. 1A and 1B is introduced into the sheet metal part. In this connection one can see, in FIG. 6A, the element above the sheet metal part 30 in accordance with FIGS. 5A and 5D and, in FIG. 6B, the element after having been riveted to the sheet metal part. The corresponding representations can be seen in partly sectioned form in FIGS. 7A and 7B, with the course of the method corresponding to the already described course of the method with reference to FIGS. 3A to 3E and with the sheet metal part 70 being understood here to be a thick sheet metal part, which is why the representation in accordance with FIG. 7B is almost identical to the corresponding representation in accordance with FIG. 4, apart from the fact that the coined features 72, 74 in the sheet metal part 30 have led to corresponding complementary coined features in the sheet metal part in the lower region of the ring fold 52, whereby an increased security against rotation is achieved.

Figure 8:
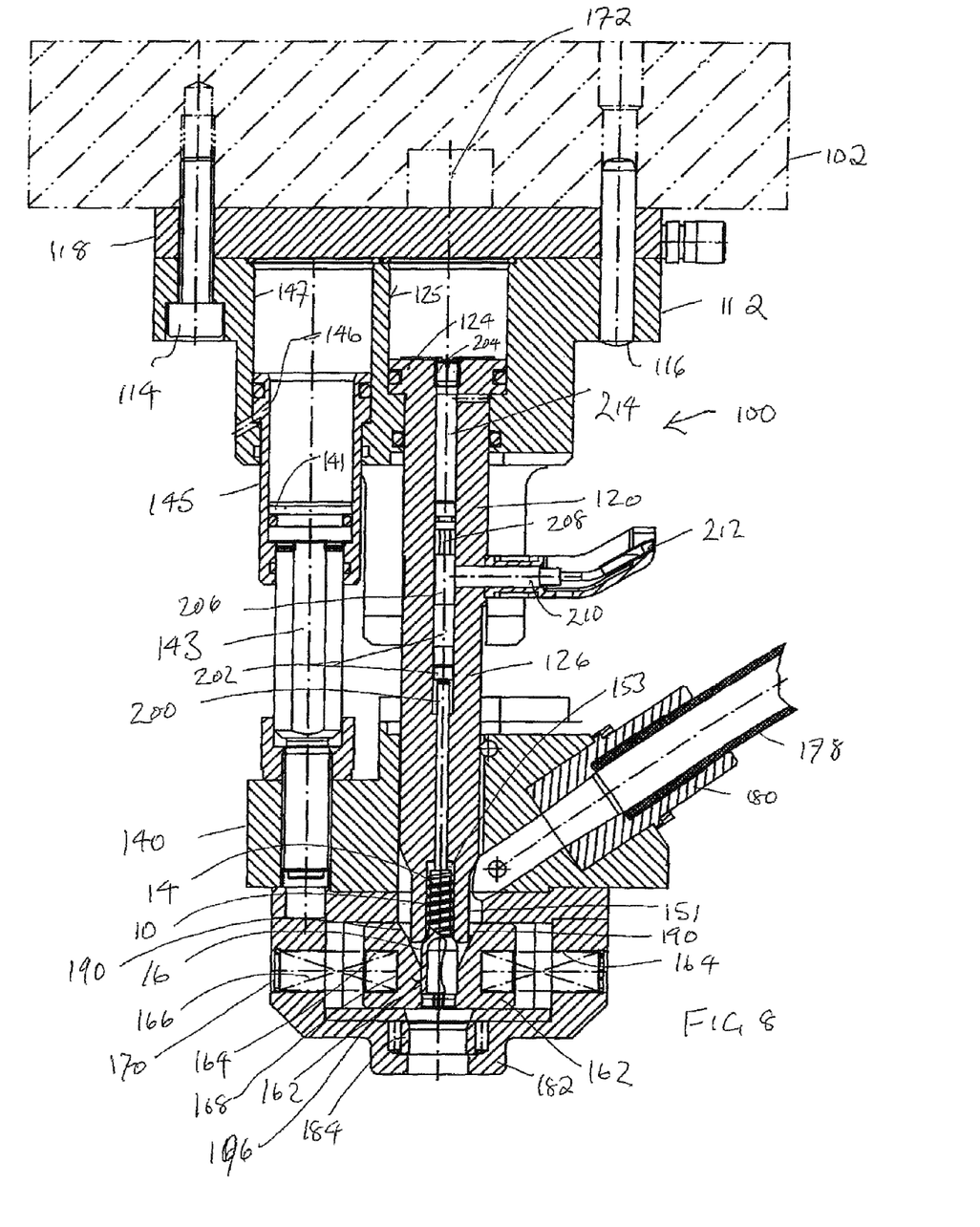

FIG. 8 shows schematically, how elements in accordance with FIGS. 1A and 1B respectively are supplied by means of a setting head 100 to the sheet metal part in course of industrial manufacture. In this connection the setting head 100 in accordance with FIG. 8 corresponds approximately to the setting head which is shown in European patent 755 749. Since the setting head is described there in detail it is sufficient here only to briefly describe the important parts of the setting head.

The guiding and setting device 100 shown in FIG. 8 has a mounting housing 112 which is secured via screws 114 and dowel pins 116 to the upper tool 102 of the press. The mounting housing 112, which has a cover 118 serves, on the one hand, to guide a plunger 120 at the upper tool 102, but acts, on the other hand, as a guide for the actual setting head 122. The plunger 120 has an upper section 124 of large diameter and a lower likewise cylindrical section 126 of smaller diameter. The upper region 124 of the plunger is formed as a piston and is pneumatically biased downwardly by pressure in the cylinder 125. The cylinder 125 is closed by the cover 118. The substantially cylindrical lower part 126 of the plunger is slidingly guided in the guide piece 140 of the setting head 100. The guide piece 140 is itself slidingly guided by a piston 141 with a piston rod 143 in a cylinder 145, with the cylinder 145 itself being slidably guided as a piston 146 in a bore 147 of the mounting housing 112. Both pistons 141 and 146, which form a telescopic arrangement, are pneumatically biased downwardly.

The lower section 151 of the plunger 120 has a smaller diameter in comparison to the section 126 and has a cylindrical opening 153 which is dimensioned in order to receive the shaft part 14 of the functional element 10. The head part 16 of the functional element 10 projects between two holding members or holding fingers 162 located inside the guide piece. It can be seen that each holding finger 162 has a cylindrical bore 164 which respectively accommodates a schematically indicated compression coil spring 166 which is braced at its one end at an end 168 of the bore 164 and at its other end at a respective cover plate 170 of the guide piece 140 and in this way biases the respective holding finger 162 in the direction towards the element 10.

Although not shown here respective centering pins can be arranged coaxial to the springs 166 so that the centering pins project through corresponding bores in the holding fingers and center the functional element and guide the holding fingers. The ends of the centering pins would then have a spacing from one another corresponding to the diameter of the head part 16 of the functional element so that the elements which are inserted into the guide piece are centered there by the centering pins.

Although only two holding fingers 162 are shown in this example further holding fingers could also be provided if this is desired.

The holding fingers 162 which are linearly displaceable in the hollow guide piece 140 and which are displaceable perpendicular to the central longitudinal axis 172 of the plunger 120 are so arranged that the elements 10 which are to be handled by the guide and setting device 100 can slide through the feed channel 178, with their cylindrical head part 16 to the fore, between the holding fingers 162 into the position of FIG. 8 but only individually and only when the plunger 120 is biased upwardly in comparison to FIG. 8 by the application of a corresponding pressure beneath the piston 124.

The feed channel 178 which is formed here by a hose is secured here by a mouth piece 180 to the guide piece 140. The part 178 can also be a magazine which is for example filled with a restricted number of fastener elements. The mouth or nose piece 182 of the guide piece 140 corresponding to the nose piece 70 of the FIGS. 3A to 3E can be provided with a resilient insert 184, for example of polyurethane, in order to exert a clamping action on the head part 16 of the functional element when this is pushed through the mouth piece 182 or through the ring-like insert 184. This clamping action not only brings about a guidance of the functional element 10 but also prevents the functional element 10 falling through the mouth piece 182 when the holding fingers 162 are open or are opened.

The holding fingers 162 have a control edge or a control surface 190 via which they can be opened by the section 151 of the displaceably arranged piston 120. During this opening movement the holding fingers 162 move parallel to the central longitudinal axis of the bores 164. During this movement of the holding fingers 162 the position of any centering pins is fixed relative to the guide piece 140.

The movement takes place against the force of the springs 166 which attempt to push the holding fingers into their end position previously bounded by stops. Moreover, clamping surfaces 196 are formed on the holding fingers 162 by which the respective functional element 10 is held in force-locked manner after the opening of the holding fingers. The force of the springs 166 which close the holding fingers 162 is used for this purpose.

Starting from the position in accordance with FIG. 8 the press is closed. As soon as the end face of the mouth piece 182 meets the sheet metal part and presses it against the die button, the guide part 140 starts to deflect rearwardly relative to the upper tool 102 and indeed until the upper end face of the piston 124 contacts the cover 118. Through a further closing movement of the press the guide part 140 of the setting head moves further backwardly relative to the upper tool, with the plunger 120, which can no longer deviate backwardly opening the holding fingers 162 and pushing the functional element between them and through the mouth piece 182 so that the functional element 10 is introduced into the sheet metal part in accordance with FIGS. 3A to 3A and is riveted in the latter by means of a die button (not shown in FIG. 8, but corresponding to the die button 32).

The corresponding rearwardly deflecting movement of the guide part 140 is possible through the telescopic design of the pistons 141 and 146 and also through the geometrical design of the setting head.

During the subsequent opening movement of the press the pistons 141 and 146 are first extended as a result of the pneumatic bias while the plunger 120 remains in contact with the cover 118 through a corresponding pressure beneath the piston 124. This signifies that the lower end of the plunger 120 has been lifted sufficiently far relative to the guide piece 140 that a new functional element 10 can be introduced beneath the plunger 120 into the feed channel, for example by means of an air blast, whereafter the pneumatic downwardly directed biasing of the plunger 120 is activated and leads to it moving into the position in accordance with FIG. 8.

The new functional element 10 can subsequently be introduced into a new sheet metal part by repetition of the already described method. The reference numeral 200 points to a control pin which senses the presence of a functional element 10 and only then permits a further closing movement of the press via a pneumatic and/or mechanical and/or electrical control which is controlled by the pin 200. Specifically, the reference numeral 204 refers to a grub screw which closes the passage in the plunger 120. Above the pin 200 there is located a pin 202 of larger diameter having a lower metal section 206, for example of an iron alloy and an upper non-conductive section 208, for example of plastic. The reference numeral 210 points to a proximity sensor which is damped by the metallic region 206 of the pin 202 when the pin 200 is raised, which points to the presence of a functional element 10, and thus detects that a functional element is present within the hollow space 153. When this applies, a control signal is given to the press control via the line 212 whereby the next stroke of the press is triggered. If no functional element 10 is present, i.e. the insulating region 208 is located in front of the proximity sensor, the proximity sensor does not transmit any signal because it is no longer damped. This state arises when no functional element is present beneath or within the hollow space 153 of the pin 126. Because the compression coil spring present in the hollow space 214 beneath the grub screw 204 presses the pin 202 and the pin 200 downwardly. When the proximity sensor does not transmit a signal or gives a signal in accordance with which no functional element is present then the press is stopped until the fault has been remedied.

The functional elements described here can for example be manufactured from all materials which achieve the strength class 5.6. Such metal materials are normally carbon steels with a content of 0.15 to 0.55% carbon.

In all embodiments all materials can be named as an example for the material of the functional elements which in the context of cold deformation reach the strength values of class 8 in accordance with the ISO standard, for example a 35B2 alloy in accordance with DIN 1654. The so formed fastener elements are suitable amongst other things for all commercially available steel materials for drawing quality sheet metal parts and also for aluminum alloys. Aluminum alloys, in particular those of higher strength can also be used for the functional elements, for example AlMg5.

The tests previously carried out have shown that when using the material 35B2 the ratio of the radial wall thickness of the head part to the outer diameter of the head part should lie in the range between 0.15 and 0.2. Higher values are desirable because they increase the rupture forces or pull-out forces. However, it must be ensured that the pressing forces do not lead to an impermissible deformation.

The invention claimed is:

1. A rivet element (10; 10'), having a shaft part (14; 14') with an outer diameter and having a hollow cylindrical head part (16; 16') of hollow right cylindrical shape designed and adapted for forming a rivet connection to a sheet metal part (30), wherein the head part (16; 16') has a right cylindrical jacketed surface with an outer diameter larger than the outer diameter of the shaft part (14; 14'), wherein the shaft part (14; 14') merges into the head part (16; 16') via a ring shoulder formed by a hemispherical portion (15; 15') such that the hemispherical portion (15; 15') extends from the shaft part (14; 14') up to the hollow cylindrical head part (16; 16') and wherein the shaft extends from the hemispherical portion all the way to the distal end of the rivet element, the shaft part being shaped, at a distal end remote from the head part, to carry out a function.

2. The rivet element (10; 10') in accordance with claim 1, wherein the hemispherical portion (15; 15') is a body of revolution.

3. The rivet element (10; 10') in accordance with claim 1, wherein the functional element (10; 10') has a central longitudinal axis (24; 24'), and the hemispherical portion (15; 15') is defined by a radius (R, R') having an origin on the central longitudinal axis (24; 24'), the radius (R; R') corresponding to a radius of the hollow cylindrical head part (16; 16').

4. The rivet element (10; 10') in accordance with claim 1, wherein the hemispherical portion (15; 15') has a wall thickness that is constant.

5. The rivet element (10; 10') in accordance with claim 4, wherein the hollow cylindrical head part (16; 16') has a wall thickness and the hemispherical portion (15; 15') also has a wall thickness, the wall thickness of the hemispherical portion (15; 15') corresponding to the wall thickness of the hollow cylindrical head part (16; 16').

6. The rivet element (10; 10') in accordance with claim 1, wherein, on attachment of the rivet element to a sheet metal part, part of the right cylindrical portion of the head part and the hemispherical portion (15; 15') of the head part are adapted to form a ring fold (52).

\* \* \* \* \*